Figure 1:
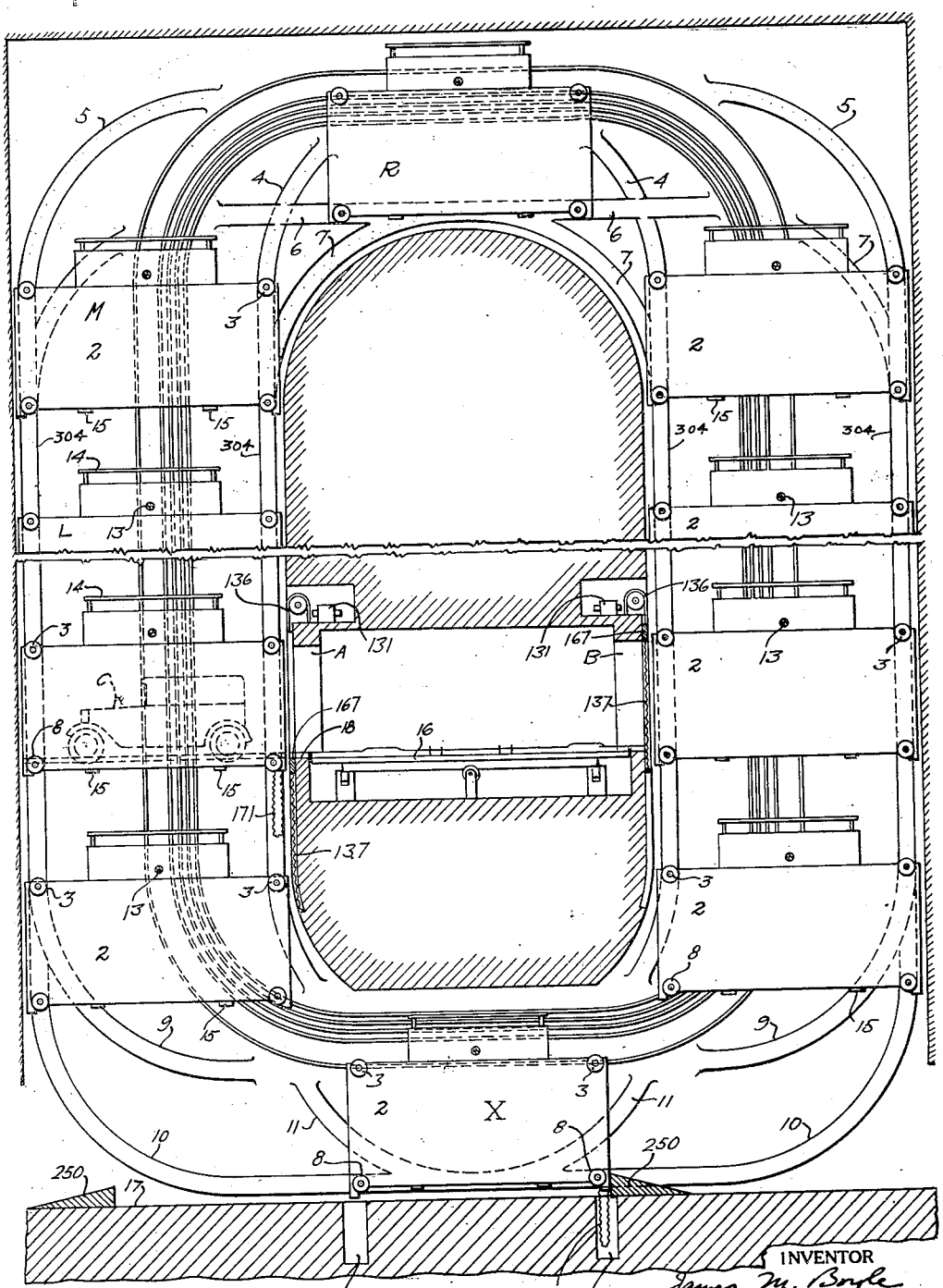

Sept. 4, 1934.    J. M. BOYLE    1,972,258
CARRIER SYSTEM
Filed Dec. 4, 1929    9 Sheets-Sheet 1

Sept. 4, 1934.  J. M. BOYLE  1,972,258
CARRIER SYSTEM
Filed Dec. 4, 1929   9 Sheets-Sheet 3

INVENTOR
James M. Boyle
BY
ATTORNEYS

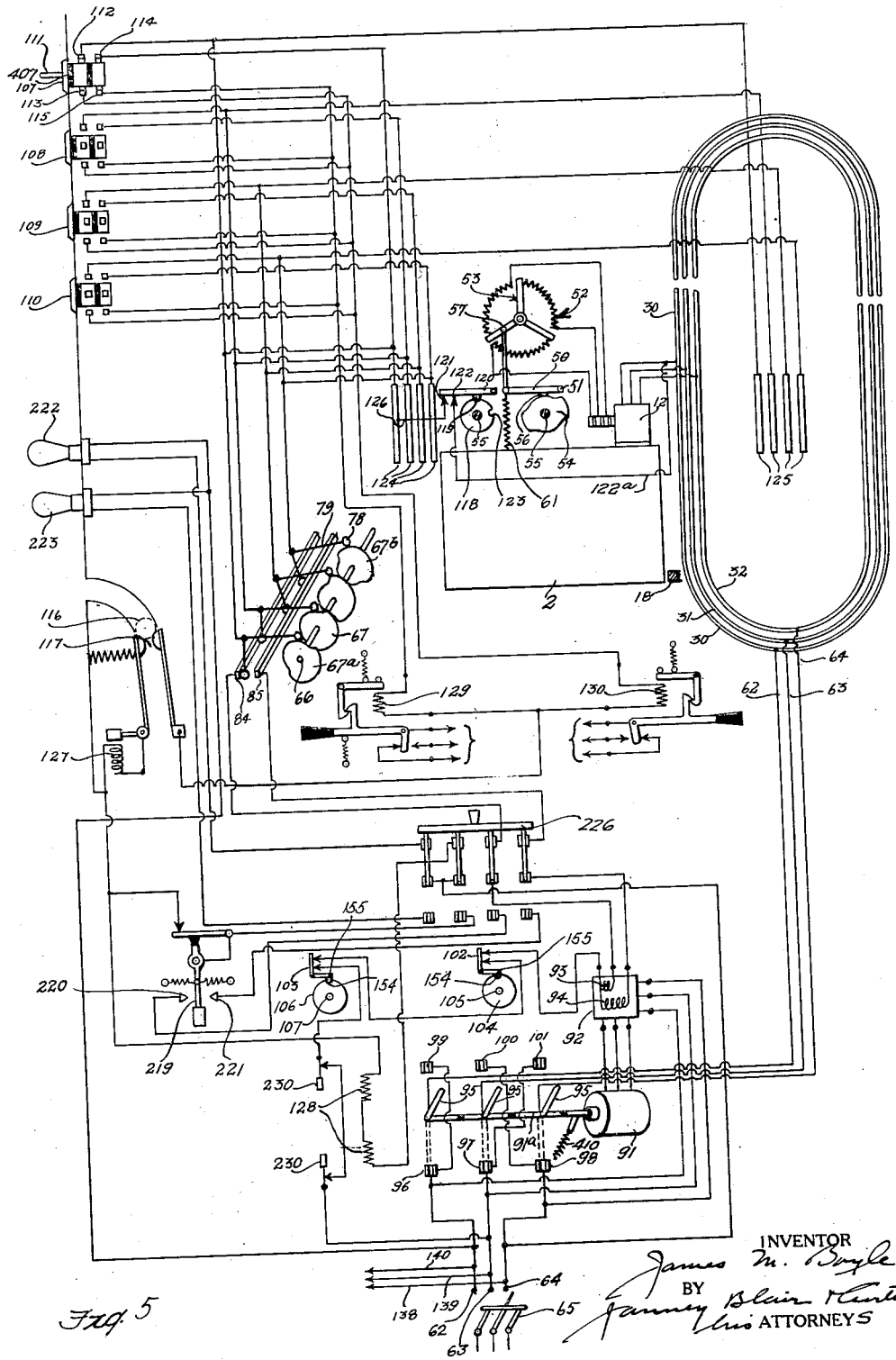

Sept. 4, 1934.  J. M. BOYLE  1,972,258
CARRIER SYSTEM
Filed Dec. 4, 1929   9 Sheets-Sheet 5
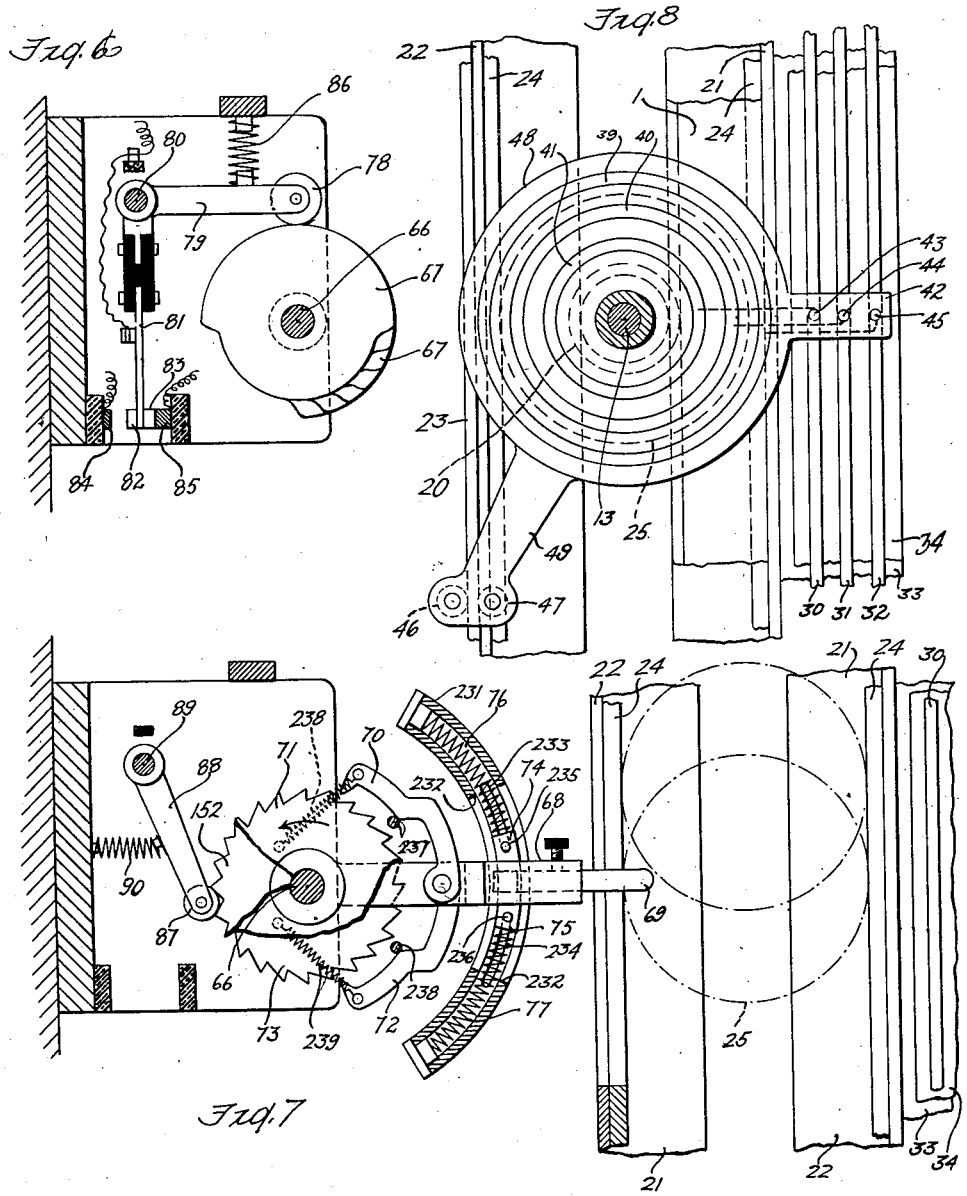

Sept. 4, 1934.   J. M. BOYLE   1,972,258
CARRIER SYSTEM
Filed Dec. 4, 1929    9 Sheets-Sheet 6
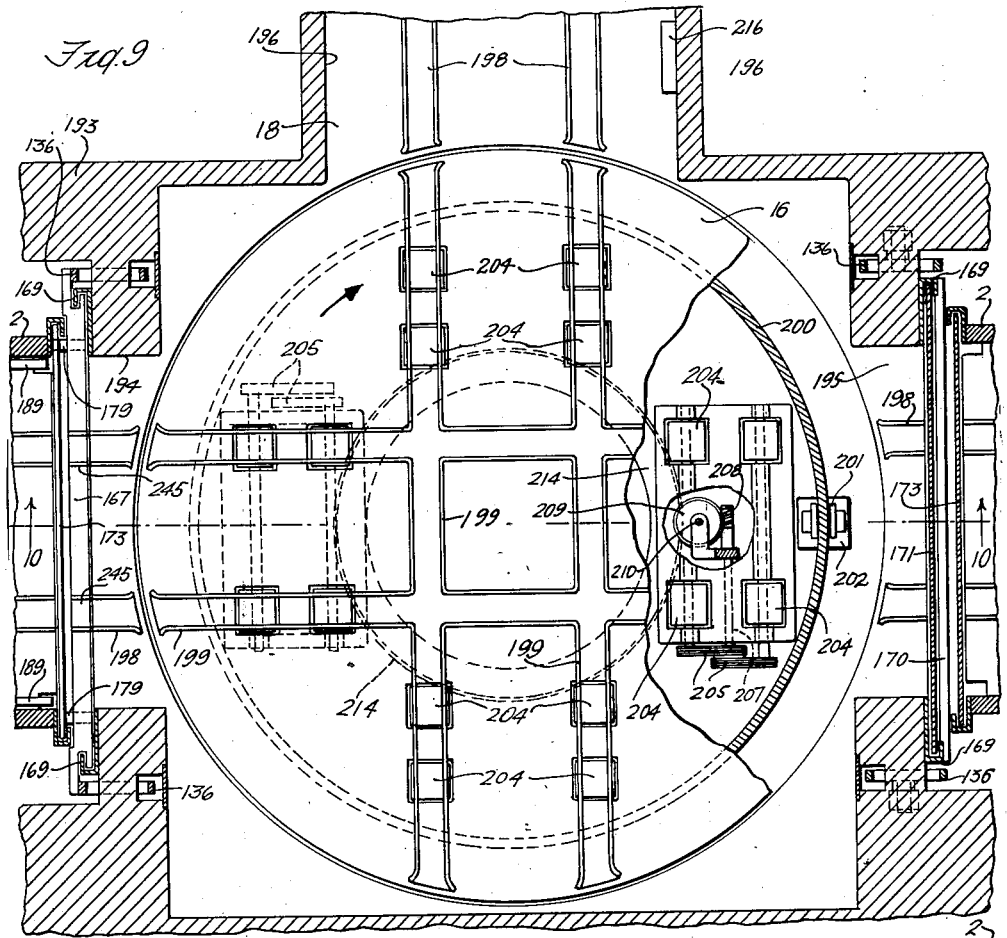
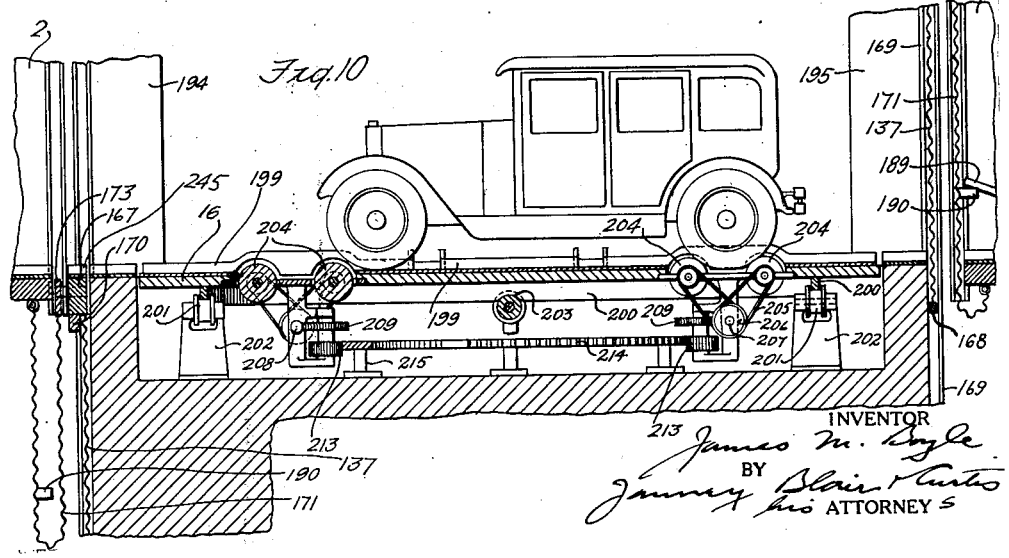

Sept. 4, 1934.     J. M. BOYLE     1,972,258
CARRIER SYSTEM
Filed Dec. 4, 1929     9 Sheets-Sheet 7
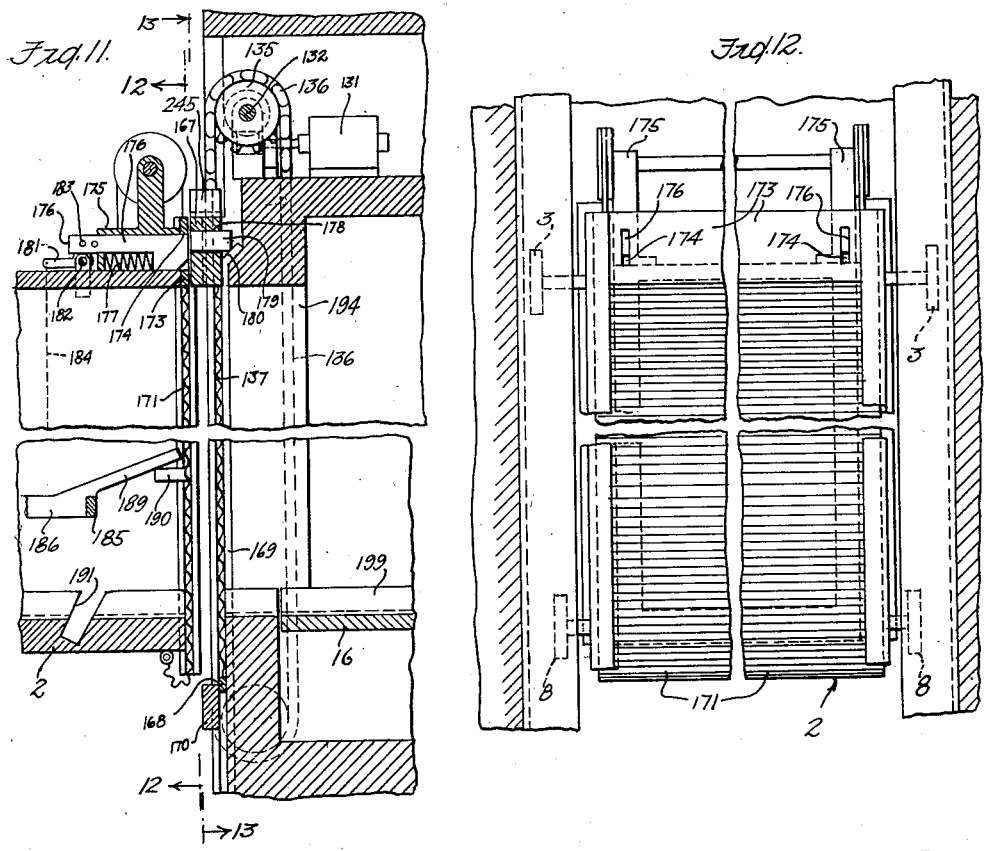
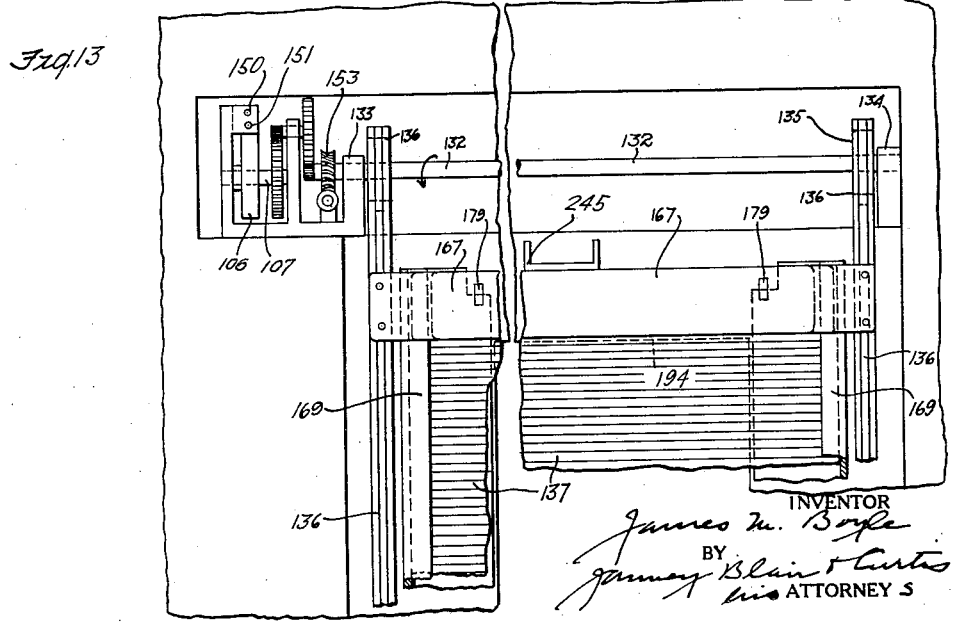

Sept. 4, 1934.  J. M. BOYLE  1,972,258
CARRIER SYSTEM
Filed Dec. 4, 1929  9 Sheets-Sheet 8

INVENTOR
James M. Boyle
BY
ATTORNEYS

Sept. 4, 1934.  J. M. BOYLE  1,972,258
CARRIER SYSTEM
Filed Dec. 4, 1929  9 Sheets-Sheet 9
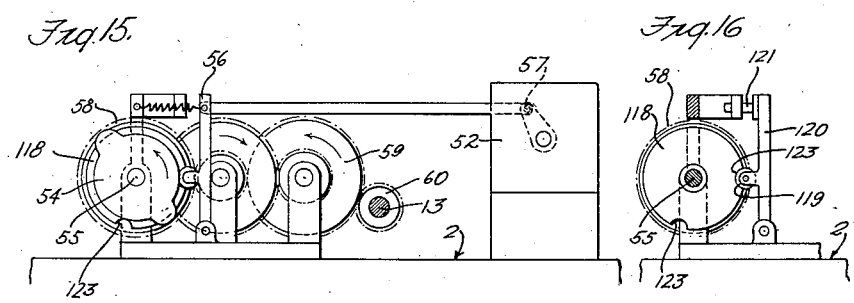
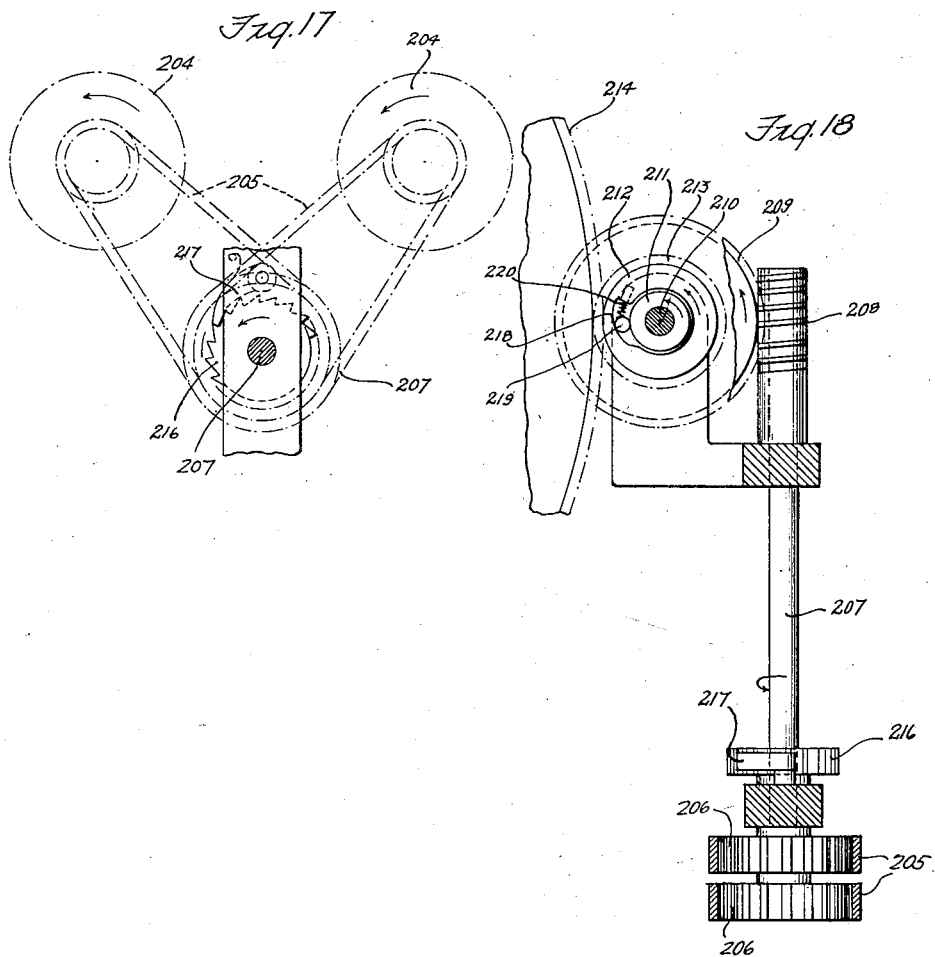

Patented Sept. 4, 1934

1,972,258

UNITED STATES PATENT OFFICE 1,972,258

CARRIER SYSTEM

James M. Boyle, Darien, Conn.

Application December 4, 1929, Serial No. 411,495

31 Claims. (Cl. 187—16)

The present invention relates to an improvement in carrier systems. One object thereof has been to provide apparatus whereby a carrier or plurality of carriers of any suitable design may conveniently be operated in connection with a remote or distant control. Where the system includes a plurality of carriers, it is contemplated that selective features will be provided whereby the direction and extent of the movement of any predetermined unit or carrier may readily be controlled. Obviously, the objects hereinabove stated may be achieved in connection with the use of apparatus of widely varying construction and design depending to a considerable extent upon the uses to which it is to be put or, if it is to be incorporated in another larger structure, upon the character or nature of use of such building or structure.

Whatever the particular use to which the individual carrier units are intended to be applied, a system according to my invention includes a track or way upon or in connection with which a plurality of independent carriers will be moved. Each carrier or unit is provided with suitable separate driving means such as a motor which is actuated by current derived from a common source. Controlling devices are employed to start and stop the carrier at will from one or more positions or stations and, although each carrier is driven by its own motor, it is contemplated that all of said motors or other driving devices shall start and stop simultaneously and in such manner that any selected unit or carrier may be halted in any desired predetermined position with respect to a selected fixed position or station when the controlling and selecting devices have operated in the intended normal manner.

In some forms of my improved apparatus it will be found desirable to automatically control or select the direction of movement of the carriers in connection with operation of the starting devices. For example, where a plurality of carriers operate upon or in connection with a continuous track or way and a loading or discharging station in fixed relation to a portion of said way, there is a substantial economic advantage in moving any selected unit or carrier to the loading or discharging station by its shortest route. Such operation involves economy both in time and in consumption of power. It is a further object of my invention, therefore, to provide apparatus whereby the direction of movement of the carriers may be automatically controlled to bring a selected carrier to a selected point or station in the system by the shortest or a predetermined route.

While apparatus of the character hereinabove referred to may be utilized advantageously in connection with transportation systems of various types, the present specification will deal with one embodiment which is more particularly adapted to be employed in connection with the moving and storing of vehicles. As thus applied, one purpose of the invention has been to provide apparatus whereby automobiles or the like may conveniently be stored or garaged under economic and practical conditions which permit portions of a building designed primarily for other uses to be devoted to the housing of automobiles. In a preferred form, the system provides what is in effect a vertical garage, or in other words, an arrangement of the carriers one above another in a suitable shaftway which permits the accommodation of a large number of cars, in proportion to the ground area occupied by the garage portion of the building.

A further object of the invention has been to apply to a garage or car storage apparatus of the vertical type a carrier control mechanism preferably operated at one or more positions or stations and whereby any selected carrier whether empty or occupied may be brought to the desired station by automatic means set in motion by some simple movement such as the turning of a switch, the dropping of a coin or both. For purposes of economy in the operation of such apparatus particularly, it will be desirable to have any selected carrier move to the desired position by the shortest route.

Where a track constitutes the continuous way over which the carriers move in normal operation, as where the carriers are mounted in a shaftway having vertical portions and horizontal portions connected by suitable curved portions, it is contemplated that the carriers will be provided with driving motors and contact devices arranged in continuous effective engagement with a suitable conductor or conductors from which the motor actuating power is derived. It is, therefore, a further object of my invention to provide automatically adjustable connecting means or contact devices between the driving mechanism of each carrier and the power conductor whereby effective driving contact may be maintained at all operative positions of the carrier on or in relation to the track or way.

It is contemplated that apparatus involving the features and advantages hereinabove indicated may conveniently be incorporated in buildings such as apartment houses, office buildings, hotels and the like, and particularly such as are located in communities where land values and other factors now tend to limit the uses to which ground space may be profitably devoted. Under these circumstances, a preferred embodiment of my invention may include suitable approaches leading to and from the carrier or to stations positioned to accommodate cars as they approach and leave the carriers. I have also provided means whereby the carriers are controllably moved toward and from conveniently positioned outlets or portals through which the cars pass on entering or leaving a carrier. A turntable or other suitable car moving device, adapted to support and turn an automobile, may be located adjacent to the portals to permit handling of a car in a minimum space.

A further object of my invention has been to provide a carrier system which may be installed in buildings without increasing the fire hazards incidental to their normal use. For this purpose each carrier is provided with means for confining a combustion destroying or fire extinguishing medium which is releasable into the carrier upon the occurrence of a predetermined temperature condition therein.

I am aware of proposed vertical garage constructions in which carriers are raised and lowered by an endless chain or chains. One disadvantage inherent in such a device, is the danger of overload on the chain. Furthermore, such apparatus would be noisy in operation and difficult to control. A vertical garage embodying my invention includes independent carriers each having means adapted to support and move its own load. Thus, any desired number of carriers may be employed in a single system whereas in a chain operated system the number of carriers permissible in a single installation is definitely limited by the capacity of the chain.

Figure 2:
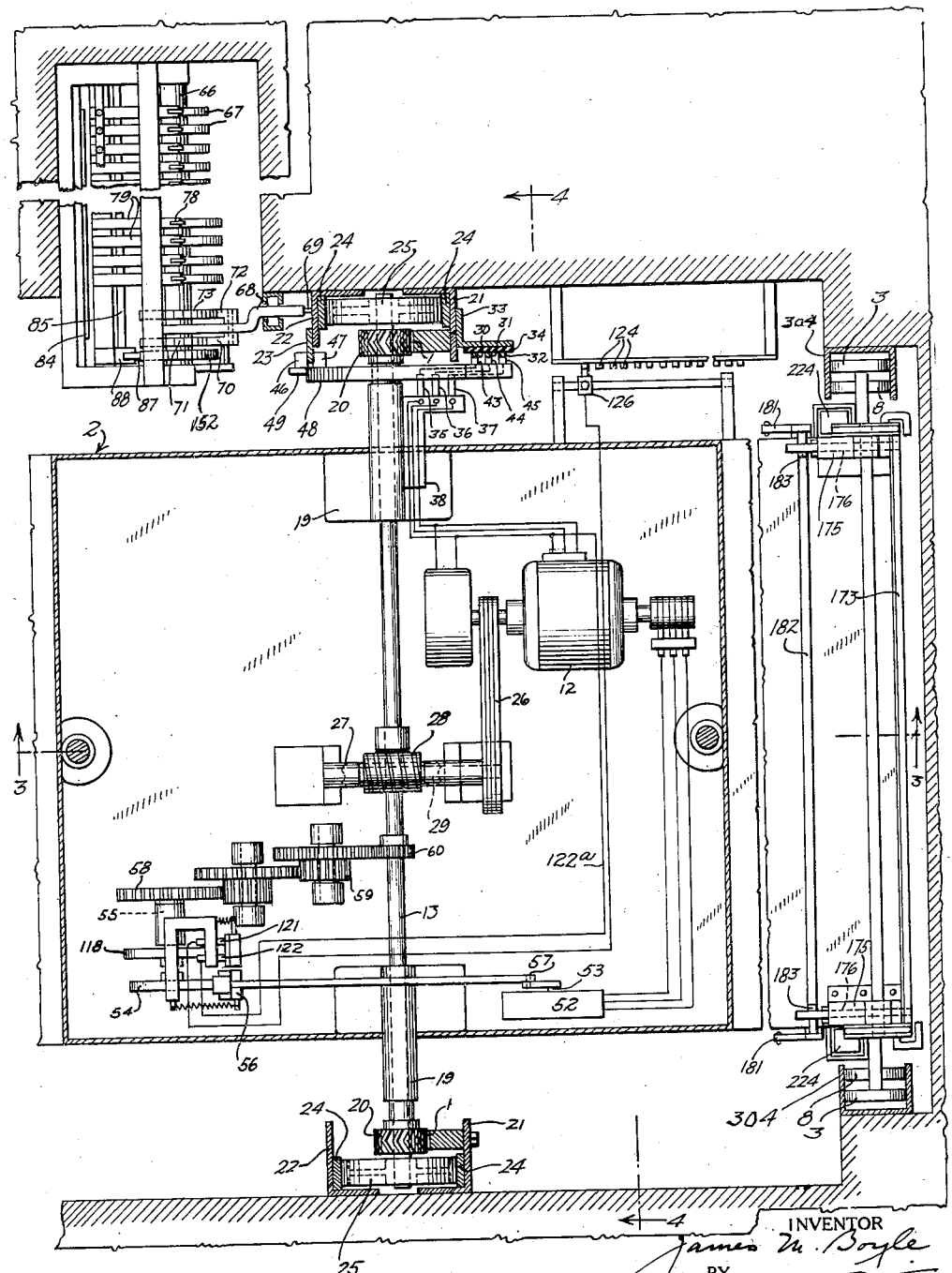
Figure 3:
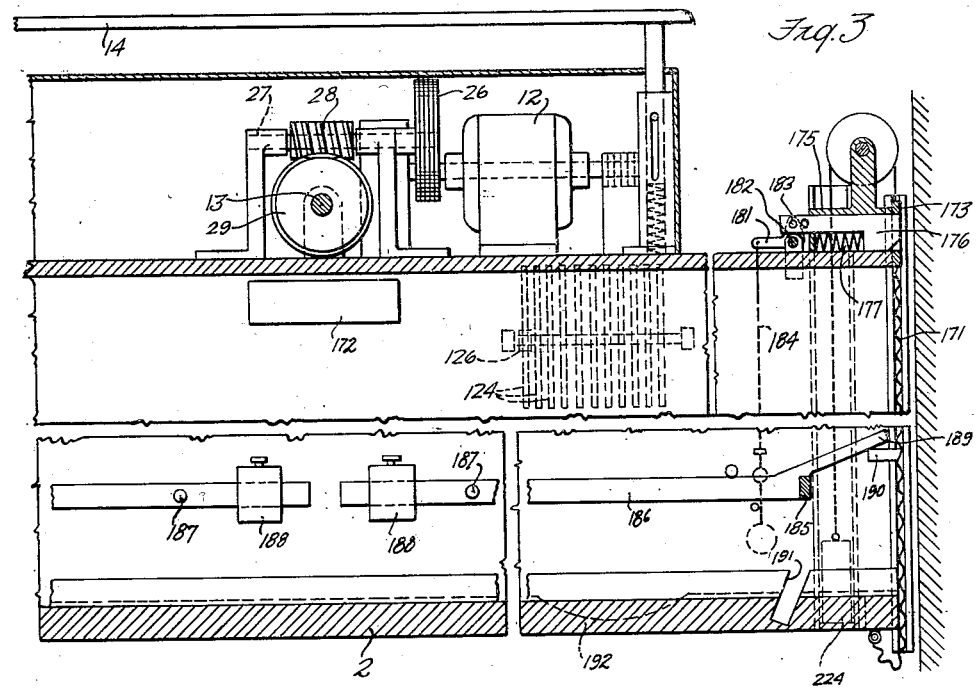
Figure 4:
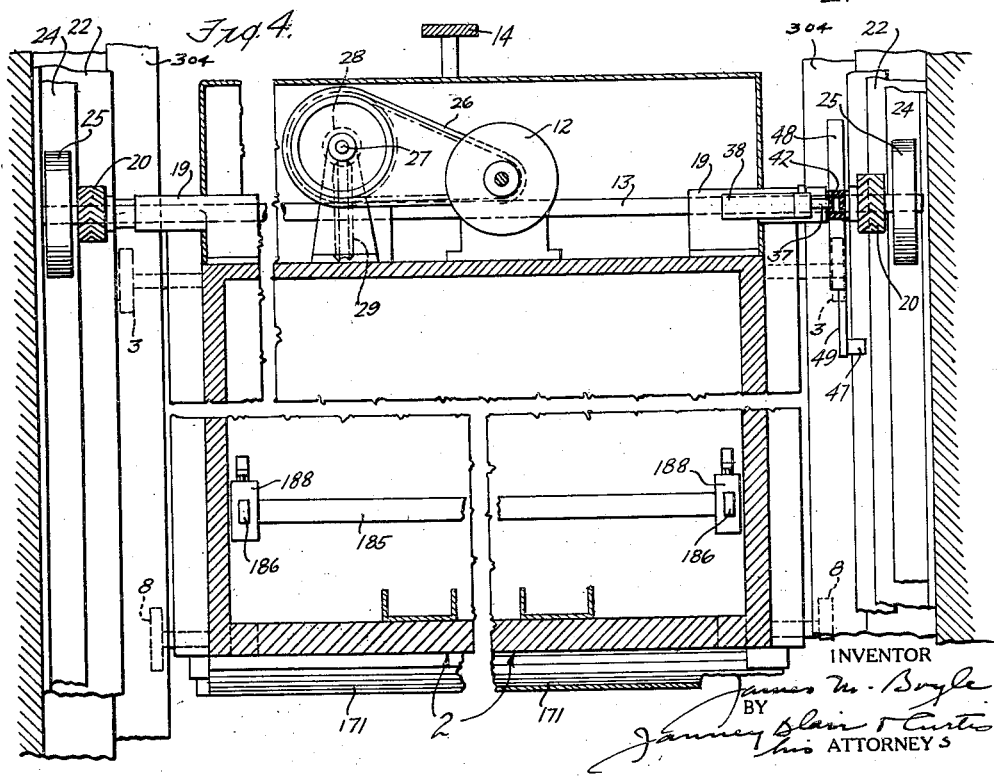
Figure 14:
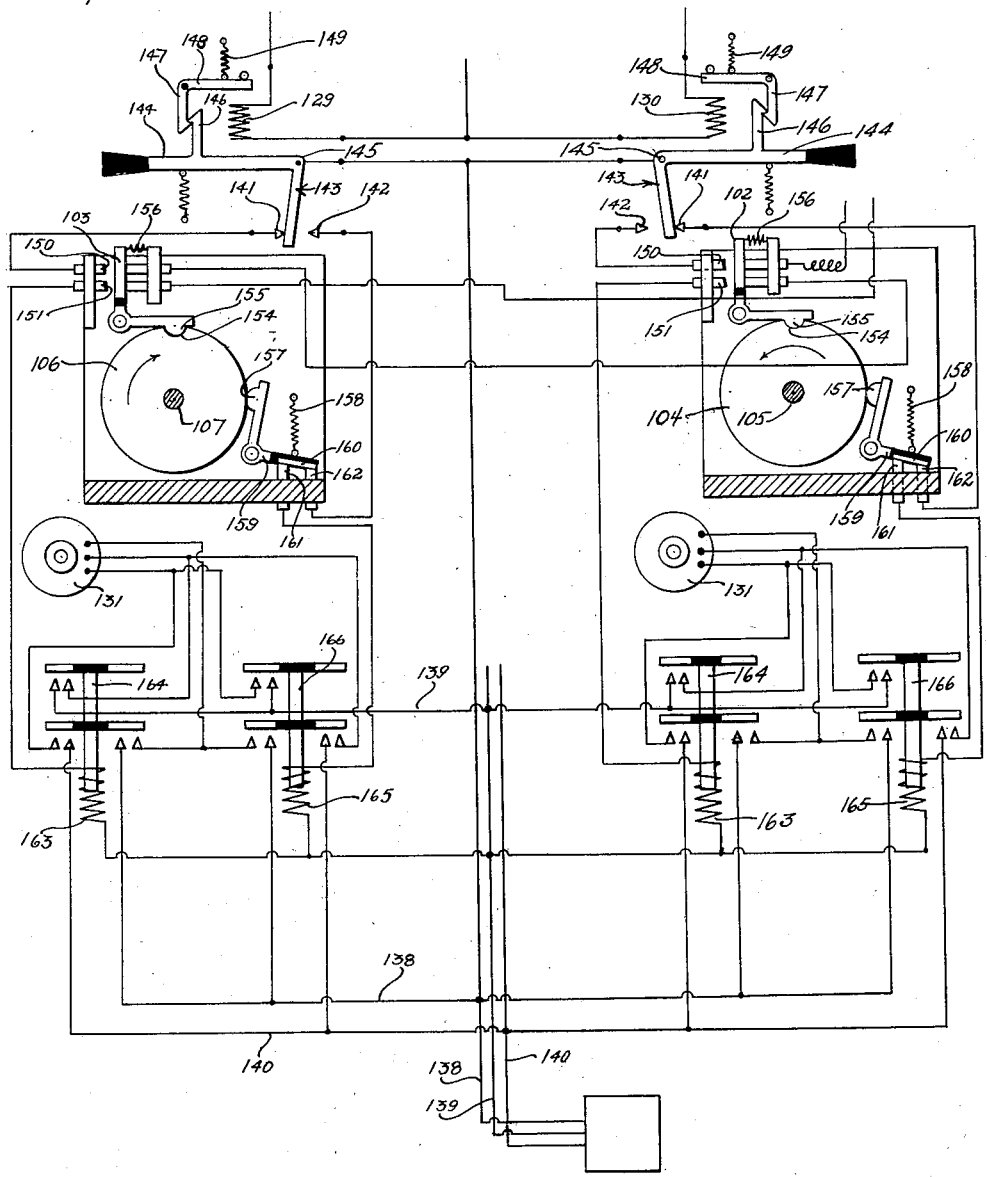

The foregoing statement of uses and advantages contemplated in connection with the operation of my improved carrier system, is not intended to be exhaustive and further advantages and beneficial results in operation will become apparent from the following description of a preferred embodiment of my invention taken in connection with the drawings of which Figure 1 is an elevation partly diagrammatic and with portions of a carrier system more particularly in the form of a vertical garage indicated in vertical section;

Figure 2, a top plan view of a portion of a carrier unit and portions of the driving and controlling mechanisms cooperating to move the unit in relation to the shaftway in which it is mounted;

Figure 3, a longitudinal vertical section on the line 3—3 of Figure 2;

Figure 4, a transverse vertical section on the line 4—4 of Figure 2;

Figure 5, a circuit diagram illustrating the power control and the direction selecting and carrier selecting devices in relation to their controlling circuits;

Figure 6 and 7, fragmentary details partly in section illustrating portions of the direction selecting and drive controlling mechanism;

Figure 8, a fragmentary detail of device for maintaining effective contact between driving motors and the power supply lines;

Figure 9, a plan view of a turntable in operative relation to a carrier system and with portions broken away to disclose turntable actuating means and also showing closure devices at the portal between the turntable and the carriers and closure devices on the carrier;

Figure 10, a vertical section on the line 10—10 of Figure 9;

Figure 11, a fragmentary view in vertical section illustrating in greater detail the construction of the portal closure member or door and the carrier closure member or curtain respectively, together with means for controlling the operation thereof;

Figure 12, a fragmentary view in transverse section on the line 12—12 of Figure 11;

Figure 13, a fragmentary view in vertical section on the line 13—13 of Figure 11;

Figure 14, a wiring diagram of circuits operatively related to mechanism for opening and closing the portal door automatically in proper relation to movement or position of the carriers in the shaftway;

Figure 15, a detail of the cam operated speed control mechanism;

Figure 16, an end view of the mechanism shown in Figure 15;

Figure 17, a fragmentary view showing a detail of the turntable mechanism; and

Figure 18, a fragmentary view showing turntable clutch and drive mechanism.

In the illustrative embodiment of my invention as applied to a verical garage construction or the like and as indicated in Figure 1, a plurality of carriers 2 or carrier units of appropriate size and shape to accommodate motor cars of normal size and design are mounted to move in controlled relation to a suitable track and to predetermined conveniently located positions or stations. Where the embodiment of my improved carrier system is of the vertical type, it is preferably housed in a shaftway provided with a track or the like in the form of racks 1 located at opposite sides of the shaftway. Each carrier is preferably suspended on a driving shaft having pinions secured at its opposite ends and actuated and controlled in a manner hereinafter to be described. Figure 1 shows a plurality of carriers 2 mounted to be moved in both directions around the tracks 1. Upper guide rollers 3 suitably mounted on the carrier 2 engage curved guides 4 and 5 positioned respectively at the inner and outer upper corners of the shaftway and forming upper extensions of vertical guides 304. Lower guide rollers 8 engage the curved guides 6 and 7 respectively at the upper portion of the shaftway also forming upper extensions of vertical guides 304. At the lower corners of the shaftway the upper guide rollers 3 engage curved guides 9 while the lower guide rollers 8 engage curved guides 10 and 11 respectively, the guides 9 and 10 being lower extensions of vertical guides 304.

As shown in Figure 2, each of the carriers is provided with a suitable driving motor 12 connected to a shaft 13, upon which the carrier is pivotally suspended. To protect the carrier and its driving and other mechanism from injury in case one carrier overtakes another, a bumper 14 (Figure 1) is yieldingly mounted upon and extends above the carrier in position to take the impact of collision between said carrier and the one next above which may be provided with suitable downwardly exposed buffers 15.

Control mechanism hereinafter to be described in greater detail is adapted to limit movement of the carriers 2 to any predetermined extent and to halt any selected one of said carriers at a predetermined station. Where the shaftway is of O-shape or U-shape and is enclosed, as by walls forming part of a larger structure, such as an apartment house, hotel or the like, effective access to the carriers may be had through one or more openings or portals, their number and location depending upon circumstances peculiar to each installation. Where the shaftway spans a single path of access, as indicated in Figure 1, openings in said shaftway may be provided at A and B, for example, whereby a car C may be moved into a carrier 2 or from a carrier 2 into position on a roadway or on a turntable, as 16. The openings A and B may also be located at different levels on the same or different sides of a shaftway. It is further contemplated that access may be had freely to the carriers at a suitable place to permit the repair or servicing thereof or of a car thereon or contained therein. The carrier 2 at the bottom of Figure 1 is represented in such relation to the basement or other level or floor 17 as to permit the car to be moved into and out of the carrier 2 and onto said floor. For this purpose, movable chocks 250 are provided to afford a suitable gradient between the floor of the carrier and floor 17. Where the floor 17 is on a basement or sub-basement level, the station turntable 16 will conveniently be located at the level of a street or of a roadway passing through the building or a portion thereof to the street.

Referring now to Figures 2 and 4, the carrier 2 is supported on the transverse shaft 13 by means of spaced brackets 19 having bearings adapted to receive portions of the shaft 13, end portions of which are provided with guide rollers 25 and pinions 20, at least one thereof being preferably of herringbone type, meshing with the racks 1. As indicated in Figure 2, the racks 1 are mounted on angles 21 positioned in parallel relation to similar angles 22. A guide strip 23 is secured to angle 22 to cooperate with contact devices hereinafter to be described. If desired, strips 24 may be secured to inner faces of angles 21 and 22 to serve as tracks upon which the guide rollers 25 may operate. Shaft 13 is driven from motor 12 through any suitable connection such as a chain belt 26 engaging a pinion mounted on shaft 27 and thence through a worm 28 and a worm gear 29 secured to shaft 13.

Power is supplied to the motor 12, which is preferably of the three-phase induction type, from conductors or rails 30, 31 and 32 suitably supported in parallel relation at one side of the angle 21 as by means of a bracket 33 carrying a thickness of insulating material 34. The leads of motor 12 connect with separate contacts or brushes 35, 36 and 37 mounted on a fixed bracket 38 and in position to engage contact rings 39, 40 and 41 respectively mounted on a pivoted plate 48, Figure 8, carried by shaft 13 and provided with an extension 42 adapted to carry brushes 43, 44 and 45 in position to engage the conductors or rails 30, 31 and 32 respectively, said brushes being electrically connected with the rings 39, 40 and 41. In order that the brushes may accurately engage said conductors at all operative positions of the carriers 2, means are provided whereby the contact carrier or plate 48 will automatically vary its angular position to maintain the desired operative connection between the conductors and the brushes. In the embodiment of my invention illustrated more particularly in Figure 8, said means are shown as including rollers 46 and 47 mounted on an arm 49 of plate 48, to engage the guide strip 23, said rollers 46 and 47 serving to maintain the brushes 43, 44 and 45 in position for effective contact with the conductors or rails 30, 31 and 32.

In the form of installation illustrated in Figure 1, it will be noted that the carriers 2 are arranged to move in vertical paths and across from one vertical path to the other by means of a horizontal path and to and from said horizontal path by a curved path. Inasmuch as the carriers 2 are independently driven, as distinguished from carriers in systems intended for a similar purpose but in which the carriers are connected in a chain-like arrangement or the equivalent, it will be desirable to provide means for varying the speed of movement of each carrier as it traverses certain portions of the track. For example, assume that the carrier marked M in Figure 1 is approaching the upper left hand curved portion of the track, closely followed by unit L and both moving at the same speed. Reaching said curved portion, M's rate of progress in a vertical direction decreases and, before it can reach its uppermost position, as indicated at R, the carrier L will have advanced vertically at sufficient speed to encounter a portion of the carrier M, unless means are provided to accelerate the movement of carrier M sufficiently for it to maintain an effective lead over the carrier L, or a sufficient lead to prevent its being engaged or struck by carrier L as the latter approaches the curved portion. The increased speed is also desirable in moving the carrier across horizontal portions of its track and curved portions leading back to position for vertical movement in either direction. Accordingly, I provide means whereby a carrier, as it approaches or reaches an upper corner from below or a lower corner from above will move with accelerated speed until the carrier again reaches a position to move in a vertical direction. If desired, the acceleration and deceleration may be made to take place in successive steps or stages or may be varied, controlled or applied in any manner deemed necessary or desirable to accomplish the desired result. The speed control apparatus illustrated in connection with the embodiment of my invention shown in the drawings provides for a single stage of acceleration with a corresponding stage of deceleration or, in other words, for two speeds, a slow or normal speed on vertical portions of the track and a high speed on curved portions thereof.

Suitable means for effecting the variable speeds above referred to are more clearly illustrated in Figures 2 and 5 wherein a rheostat 52 is shown in operative power controlling relation to the motor 12. A rotatably mounted triple contact 53, Figure 5, is adjustable to vary the effect of the resistance coils of the rheostat 52 by suitable controlling means operatively connected with the drive shaft 13, as more clearly shown in Figure 2, and including a cam 54 mounted on shaft 55 to control the extent and direction of movement of a cam follower 56 on an arm 50 having one end pivotally connected to the contact 53 at 57 and the other end pivotally secured at 51. A spring 61 is secured to arm 50 and normally tends to hold said arm in the position shown in Figure 5. Thus, with the parts in the position as shown in said figure, motor 12 operates at its normal or low speed. When cam 54 is rotated to a position at which the cam follower 56 is moved outwardly, the contact 53 is rotated in a direction to reduce the resistance in rheostat 52 thus increasing the speed of motor 12. Deceleration to normal speed is effected when cam 54 again permits inward or downward movement of cam follower 56.

To insure accurate and uniform operation of the above described motor speed varying means, the cam shaft 55 is arranged and adapted to make one complete rotation for each complete trip or cycle of the carrier 2 around its track. Obviously the cam 54 mounted thereon rotates in similar relation to the carrier cycle. The movement of shaft 55 may therefore be utilized to effect the actuation not only of the motor speed control above described but also the control of any other mechanism intended to operate at predetermined positions of the carrier in relation to its cycle or to the racks 1. The desired synchronism of movement of shaft 55 with respect to the movement of carrier 2 on racks 1 is effected by properly related gears 58 and 59, Figure 2, arranged in a train interposed between said shaft 55 and a gear 60 mounted on drive shaft 13.

Power is supplied to the rails 30, 31 and 32 through power mains 62, 63 and 64 respectively, Figure 5. A main switch 65 connects said power mains with suitable leads from street mains. As indicated more clearly in the lower portion of Figure 5, an automatic control switch is interposed in the power mains 62, 63 and 64 in such a way that, when the circuit is completed through one set of terminals, the carrier driving motors operate in one direction and when completed through another, said motors operate in the opposite direction. This switch, conveniently referred to as the direction control switch is caused to operate so that, when a certain numbered carrier is required to be moved from any given position in the shaft to its position at a portal, said carrier will automatically move to the nearest portal by the shortest route.

Suitable control mechanism for this purpose includes a shaft 66, Figures 2, 6 and 7, to which is secured a plurality of switch operating cams 67, one cam for each carrier. The angular position of said shaft is determined by suitable means including a lever arm 68, Figure 7, which has one end pivotally mounted on said shaft 66 and carries at its free end a finger 69 extending through angle 22 and strip 24, Figure 2, into the path of the guide roller 25. A pawl 70 pivotally mounted on lever arm 68 engages a ratchet 71 secured to the shaft 66 to rotate the same in a counter-clockwise direction. Another pawl 72 similarly mounted on lever arm 68 but at the opposite side thereof engages a ratchet 73 also securely fastened to the shaft 66 to rotate the same in a clockwise direction. The lever arm 68 engages slide blocks 74 and 75 which engage the ends of compression springs 76 and 77 respectively to yieldingly maintain finger 69 in its normal position, as shown in Figure 7. Blocks 74 and 75 and springs 76 and 77 are mounted in an arcuate housing 231 provided with opposed longitudinal slots 232 which embrace and guide the lever arm 68. Relatively shorter opposed slots 233 are positioned to receive guide pins 235 extending laterally from block 74, and slots 234 are positioned to receive guide pins 236 extending laterally from block 75, said slots and blocks and springs cooperating with the lever 68 to return and normally maintain the same in its intermediate position, as shown in Figure 7.

The inwardly exposed edges of pawls 70 and 72 engage guide posts 237 and 238 respectively to maintain said pawls normally out of engagement with the ratchets 71 and 73. However, when lever 68 is deflected, as upwardly for example, the forward end of pawl 70 will be drawn inwardly by spring 238 to a position to engage ratchet 71. When lever 68 is deflected downwardly the forward end of pawl 72 is drawn inwardly by spring 239 to a position to engage ratchet 73. In operation, when the roller 25 of any carrier moves downwardly past finger 69, the latter is deflected downwardly a sufficient distance to rotate the ratchet 73 one notch in a clockwise direction. When roller 25 of any carrier moves in the opposite direction, finger 69 is deflected upwardly to a sufficient extent to rotate the ratchet 71 one notch in the opposite or counter-clockwise direction. The purpose of the ratchet and pawl mechanisms just described, is to rotate the shaft 66 and consequently the cams 67 secured thereto in such a manner that whenever the manual or automatic controls are operated, as for example, to admit a car to or remove it from a selected carrier, the power circuits of the motors will be closed to actuate said motors in one direction or the other, depending upon the position of the selected carrier, to bring said carrier to a portal by the shortest route.

As indicated in Figures 2, 5, and 6, a cam follower 78 is arranged to ride on the cam surface of each cam 67, being supported in said position at one end of a rocker arm 79 pivotally mounted at 80 and having a contact arm 81 provided with terminals 82 and 83 interposed between and adapted to engage terminals 84 and 85 respectively. With the parts in the relative positions shown in Figure 6, the terminal 83 engages terminal 85, thus causing the direction control switch, actuated as hereinafter described, to close the power circuit so that the driving motors will operate in one direction. If by reason of the passage of carriers across finger 69, the cam follower 78 should engage a portion of the cam 67 at a different point, for example, 180 degrees (180°) from the position indicated in Figure 6, terminal 82 would engage terminal 84, thus causing the direction control switch to close the power circuit so as to reverse the driving motors. Referring again to Figure 6, a spring 86 bears against one arm of lever 79 to retain the cam follower 78 yieldingly in operative engagement with the cam surface of cam 67. As shown in Figure 7, a roller 87 is mounted at the free end of a lever arm 88 pivotally mounted at 89, said roller being positioned to engage a ratchet wheel 152 on shaft 66, its purpose being to prevent back lash and/or to take up any lost motion of rotation which might develop in respect to the rotation of shaft 66 by the ratchets 71 and 73. A spring 90 bearing against one edge of the lever 88 tends to hold the roller 87 in operative position.

Each of the cams 67, 67a, 67b, etc. as shown in Figure 5, presents an elevated cam surface over 180 degrees (180°) of its periphery, while the remaining 180 degrees (180°) is relatively lower. These differently elevated surfaces engaging the cam follower 78, operate switches, hereinafter to be described, and which selectively close one or the other of two parallel branches of the start circuit to actuate the carrier driving motors forwardly or in reverse, depending upon the position in the system of the required carrier.

The direction control mechanism also includes a direction control switch operating motor 91, Figure 5, of the 3-phase induction type having a switch blade carrying shaft 91a, the direction of rotation of which is controlled through a transfer relay 92, having coils 93 and 94 in circuit with the terminals 82, 84 and 83 and 85, respectively.

Said direction control switch is conveniently identified by its blades 95 and includes two sets of terminals, namely 96, 97 and 98, and 99, 100 and 101, respectively, which are selectively engaged by the blades 95 as hereinafter described.

In operation, when relay coil 93 is energized, as by closing its circuit through proper switches, motor 91 operates to deflect the blades 95 on shaft 91a of the direction control switch downwardly from an intermediate or open circuit position to engage the terminals 96, 97 and 98 respectively. When coil 94 of the transfer relay 92 is energized, the switch blades 95 are deflected upwardly from their intermediate position to engage terminals 99, 100 and 101. It will, of course, be understood that the phase angles of the current components in the mains at terminals 96, 97 and 98 respectively are different and that when these are applied to the carrier driving motors in one relation, they operate to raise the carriers and when applied in a different relation the motors operate to lower the carriers. The change in effective relationship of the different components is achieved through operation of the direction control switch comprising the blades 95 and the terminals 96, 97 and 98 and 99, 100 and 101 respectively above described. For example, in both closed positions of the blades 95, the current component in contact 96 reaches the motors through terminal 99 and main 62. When the blades 95 are in downward position with one engaging terminal 97, the current component therein is transmitted to the motor through power main 63. However, when blades 95 are closed in the upper direction to engage terminals 100 and 101, then the current component in terminal 97 passes through terminal 101 and thence through power main 64, thus reversing its relative position with respect to the current component transmitted to the motors through the terminal 98. The blades 95 are normally held in an intermediate or open circuit position by means of a spring 410 operatively connected to the blade carrying shaft 91a of motor 91.

Referring again to Figure 5, the alternative parallel circuits containing the relay coils 93 and 94 respectively, cooperate with a start and stop circuit which is opened and closed by means of automatic switches 102 and 103 among others, the switch 102 being actuated by cam 104 mounted on shaft 105, while the switch 103 is operated by a cam 106 mounted on a shaft 107. The shafts 105 and 107 form part of apparatus for opening and closing portal doors hereinafter to be described in greater detail. For the present, it is sufficient to note that the portal door controlled switches 102 and 103 are intended as safety switches to control operation of the direction control switch motor 91 in such a way that while any portal door remains open, the carrier driving motors will not be permitted to operate. However, as soon as both doors, or any number of doors which may be provided to open and close at a corresponding number of portals are closed, the direction controlling circuit is complete for the next operation of moving a selected carrier from one position in the system to another, except that a switch or switches controlled by coin and/or key or otherwise are interposed in said circuit to effect operation of the direction controlling switch and starting and stopping devices.

For example, in the embodiment of my invention in Figure 5, portions of the direction control circuits, namely, those including the coils 93 and 94 are co-extensive with and form part of another circuit, conveniently identified above as the start and stop circuit and which may be closed at will by any suitable switch mechanism depending upon the circumstances of use, in addition to the automatic switches 102 and 103. For some cases, a coin operated switch is interposed in the start and stop circuit; while in others the closing of said circuit may be made to depend upon a key actuated switch having the function of closing said circuit and permitting the proper and timely operation of suitable stopping devices associated with the start and stop circuit and hereinafter to be described in greater detail. Manual control of such a circuit is also provided for convenience in connection with servicing the carriers and cars carried thereby.

In a preferred embodiment of my invention a plurality of switch locks is provided, one key and lock for each carrier and each lock adapted to open and close as many start and stop switches as there are portal doors. The wiring diagram, Figure 5, is shown as applied to a system comprising four carriers arranged in a shaft or way provided with a right portal and a left portal having doors, curtains or the like, in connection with which the shafts 105 and 107 previously described are arranged to cooperate. In such a system, any carrier may occupy any position at one side or the other of either of the portals. Therefore, the direction control mechanism will preferably operate to bring a selected carrier by the shortest route to the nearest portal. For this purpose, the key actuated switch mechanism includes a switch and corresponding circuits for each portal, in the present case two. The lock mechanisms for controlling the position of said switches are represented in Figure 5 at 407, 108, 109 and 110 respectively. A key 111 is shown in operative position in the lock 407, and when so positioned, said key closes the circuits containing the terminals 112 and 113, and 114 and 115 respectively, the terminals 112 and 113 being more particularly identified with the start and stop control of carriers at the right hand portal, and the terminals 114 and 115 being related to the start and stop control of carriers at the left hand portal. Thus, when key 111 is inserted in the lock 407 and the lock turned to switch closing position, both circuits are closed and, regardless of the position of the carrier, such portion of the direction selecting circuit is closed that the direction of the next increment of movement of the carriers is now predetermined, although in the illustrated embodiment the starting circuit is not completely closed to effect driving operation of the motors until a suitable coin 116 is inserted to connect the terminals of a switch 117.

The direction control and starting and stopping circuit or circuits includes motor stopping means or means whereby the carriers will stop automatically to position a selected carrier at a predetermined portal. Accordingly, assuming that a selected carrier is at any position in the system other than at a portal, the control circuit would be closed and adapted to open only upon the carrier reaching its destined position at a portal, or in case the carrier should happen to be at a portal when the key corresponding to that particular carrier circuit is inserted in the corresponding switch lock.

The stop control will be better understood by reference to Figures 2, 5, 15 and 16. The cam shaft 55, heretofore referred to in connection with the motor speed control, also carries another cam 118 adapted to engage a cam follower 119 attached to a lever arm 120. A conductor strip mounted at one end of said lever arm 120 is positioned to connect terminals 121 and 122 positioned in that portion of the direction control and starting and stopping circuit which includes the key controlled switch lock 407, this being the lock which controls the movement of a corresponding carrier. Thus, although the key 111 is inserted in lock 407, and all other controlling factors are properly related, the stop circuit is open through the terminals 121 and 122 and remains open until a notch 123 in the periphery of cam 118 reaches a position beneath follower 119 and causes the lever arm 120 to be deflected into circuit closing position. It will be remembered that cam shaft 55 is calibrated to turn through 360 degrees (360°) for each complete traverse of the carrier on which it is mounted and that the notch or notches 123 therein represent a position or positions of the carrier opposite one or the other of the portals. However, the stop circuit remains open until the carrier is about to reach its stop position and can be closed only through contact strips 124, one for each carrier positioned opposite or adjacent to the left portal and similar contact strips 125 similarly positioned in relation to the right portal.

As shown in Figures 2 and 5, a contact 126 preferably adjustably mounted on a carrier 2 is positioned to engage one of said contact strips 124 when the carrier is opposite the left portal and a corresponding contact strip 125 when the carrier is opposite the right portal. It will be understood that a contact similar to contact 126 is provided for each of the other carriers in the system and each such contact is adjustable to engage its corresponding separate strip 124. The stop circuit includes a lead 122a extending between the terminal 122 and the rail 30. By reason of this connection with rail 30, the stop circuit is energized only when the main control switch 95 is in closed position. In this respect, the stop circuit differs from the direction control and start circuits which are energized through leads connecting across the main power line outside of the main control switch, or between the switch 65 and the contacts 96, 97 and 98.

In operation, assuming that the carriers have been moving in either direction and with the selective mechanism properly set to halt a predetermined carrier at one or the other of said portals, the stop circuit will first be affected by the contact 126 on the carrier coming into engagement with one of the strips 124 or 125. As shown in Figure 5, the contact 126 engages one of strips 124 on the left and rides along said strip until one of the notches 123 in the cam 118 arrives in position to close the circuit terminals 121 and 122. The current conditions introduced by the closing of the stop circuit are such that several results are effected at substantially the same time. For example, a solenoid or other suitable coil 127 is energized in such a manner as to release the coin 116 from engagement between the terminals of switch 117. At the same time, coils 128 of a circuit breaker having terminals 230 in the circuit of the transfer relay coils 93 and 94 are energized to open the direction control circuit between said terminals. This de-energizes whichever of said coils 93 and 94 happens to be energized, whereupon the spring 410 deflects the blades 95 of the direction controlling switch from their operative power circuit closing position to the inoperative intermediate or open circuit position shown in Figure 5, so that the main power circuit which supplies current to the motors is thereby opened and the motors stopped. The operation of the parts hereinabove described brings any selected carrier to rest opposite one or the other of the portals, depending upon which portal was nearest the selected carrier at the time the corresponding lock was operated to close the direction control circuit.

A typical cycle of operation of the devices hereinabove described may conveniently be explained by reference to the apparatus shown in Figures 1 and 5. Let it be assumed, for example, that it is desired to bring the carrier M to the level of the turntable 16, and in a position adjacent to either one of the portals A and B respectively. The person desiring the presence of the carrier M does not ordinarily know where it is located in relation to the rest of the system; nor does it matter. Assume further that the lock 407 closes the particular terminals 112, 113, 114 and 115, related to the carrier M; and that key 111 is the key for operating lock 407 to effect the closing of said switches. It is also assumed that the portal doors of both portals are closed and that the carrier M is not then in position at one of the portals but is remote therefrom, somewhat as indicated in Figure 1 for example.

The insertion of key 111 into lock 407 and its turning into the position shown in Figure 5 connects terminals 112 and 113 and 114 and 115, respectively. This insures operation of the stopping devices at either portal, since the contact strips 124 and 125 are now connected with the start circuit, although said strips are not alive until just before the carrier reaches a portal position. The insertion of a coin 116 in the switch 117 now effectively closes the start circuit, including the operative direction control portion thereof. The diagram indicates that the particular cam 67a, which has an angular position at all times depending on the position of carrier M in the system, is on this occasion so disposed that the direction control circuit is closed through the portion which includes terminal 84 and transfer relay coil 93. The energizing of this coil causes motor 91 to throw the switch blades 95 downwardly, for example, to engage the power circuit terminals 96, 97, 98 in such manner that the current in the carrier driving motors 12 causes them to move all the carriers in a counter-clockwise direction because carrier M is nearer to the left-hand portal A than to the right-hand portal B, Figure 1.

If, instead of carrier M, a person requires carrier X, occupying the bottom central position, Figure 1, its controlling switch being 110, the transfer relay coil 94 is energized by operating said switch with a proper key, thus causing the power circuit to be closed to move the carriers in a clockwise direction. In this particular case the length of the route of carrier X to either portal would be the same. This is also true with respect to carrier R centrally positioned at the top of Figure 1.

Return now to carrier M, which is moving counter-clockwise toward portal A. As previously explained this carrier, as well as the others, carries a shoe or contact 126 which engages one of the contact strips 124 when carrier M arrives at a position near portal A. The same shoe 126 would engage one of the contact strips 125 if the carrier M were approaching the opposite portal B. As shown in Figure 5, however, shoe 126 on carrier M has ridden into engagement with one of the strips 124 and has thereby connected the stop control circuit with the start circuit. As previously explained, the stop circuit is controlled by a switch having terminals 121 and 122 which are operatively connected when the carrier M reaches the portal or stop position, thus bringing one of the switches 123 into operative relation to the lever arm 120. Closing of the stop circuit, which includes lead 122a, causes a sudden additional energizing of the circuit including the circuit breaker coils 128 which operate to momentarily break the start circuit between the terminals 230, thus de-energizing coil 93 and thereby stopping the carrier driving motors 12.

At the same time coil 127 is energized and deflects switch 117 to release the coin 116; and at the same time, coil 129 is energized to set in motion the mechanism for opening the door at portal A, as hereinafter described.

Assume that a car has been removed from carrier M after its door has opened at portal A; that the hand-operated door closing lever has been thrown into door-closing position; and that the key 407 has been turned to inoperative position. The next person requires an empty carrier and finds the key in lock 107 which indicates that the corresponding carrier, namely carrier M, is empty. It is understood that the car owner will remove the key from any given lock while his car is stored in the carrier corresponding thereto and will leave the key in the lock when he removes his car. A coin is inserted at 116, and key 407 is again turned to close the start circuit as hereinabove described. But carrier M does not move because contact 126 is on the strip 124 and the stop circuit switch at 121, 122 is closed; so that the start control circuit is immediately broken at the terminals 230. However, coil 129 is again energized to open the door, as hereinafter described and coil 127 is energized to release the coin. The car to be stored is moved into the carrier, the door closing lever is thrown to close the door, and key 407 is removed from lock 107. The coin controlled switch at 117 and relay at 127 form no necessary part of the system, although their usefulness in connection with garage operations under certain conditions will be apparent.

A further effect of the closing of the stop circuit is the energizing of one of coils 129 and 130. As shown in greater detail in Figure 14, these coils control the operation of suitable portal door opening and closing mechanism, the purpose being to provide means for automatically opening the portal door upon the arrival of a selected carrier at its operative position adjacent thereto. The door is closed, however, by a manual operation which not only causes the door closing means to operate but also causes switches 102 and 103, previously referred to, to close a portion of the start control circuit. In fact, the start control circuit can operate only when the portal doors are both in closed position, the purpose of this arrangement being to avoid or prevent accidental moving of the carriers while a car is being moved into or out of one of them.

As indicated in Figure 11, a motor 131, operating through intermediate gearing preferably including a worm gear 153, drives a shaft 132 journaled in brackets 133 and 134, Figure 13. Sprockets 135 or the like are mounted on shaft 132 and support endless belts or chains 136 which carry a curtain or door 137 adapted to be moved downwardly to open the portal and to be moved upwardly to close the portal. The motors 131 are of the three-phase induction type driven by current derived through suitable mains as 138, 139 and 140, Figures 5 and 14.

The portal door control mechanism shown in Figure 14 represents an arrangement suitable for a system in which two portal doors are provided, namely a left portal and a right portal. Obviously, the same or similar additional devices may be provided to control additional portal doors. Suitable control mechanism for the purpose indicated may conveniently include a switch adapted to close a circuit through one terminal when set by hand and through another terminal when automatically released. For example, the illustrated portal door motor circuit includes fixed terminals 141 and 142. A switch 143 is mounted on one arm of a bell crank lever 144 pivoted at 145 and provided on its other arm with a hook 146 adapted to engage another hook 147 mounted on a bell crank lever 148, one end of said lever forming an armature positioned for effective operation in connection with the coil 129 or 130. A spring 149 tends to hold the lever 148 normally in position to be engaged by hook 146 when the free end of bell crank lever 144 is moved upwardly a sufficient distance for hook 146 to engage the hook 147. In this position of the bell crank lever 144, the switch 143 engages fixed terminal 141. The corresponding circuit, however, is not yet closed owing to the position of switch 103, which is out of engagement with terminals 150 and 151.

Referring now to Figure 13, it will be noted that the portal door driving motor and its driven shaft 132 are connected by suitable gearing to the cam shaft 107 which carries cam 106 provided with a notch 154. A cam follower 155 is maintained in yielding engagement with the surface of cam 106 by a spring 156, Figure 14. Another cam follower 157 is also held in yielding engagement with the cam surface of cam 106 by means of a spring 158, one end of which is secured to a bell crank lever 159 which carries a switch 160 adapted to open and close a circuit containing fixed terminals 161 and 162. With the parts in the relative positions shown in Figure 14, the circuit of motor 131 is closed in such a way that the next increment of operation will cause the portal door to move downwardly or into open position. This, however, cannot take place until the hand set switch 143 is released by the energizing of coil 129 so that switch 143 will move into engagement with the fixed terminal 142. It will be recalled that coil 129 is energized through that portion of the control circuit hereinabove referred to as the stop circuit, meaning that portion in which the energizing effect takes place when the selected carrier is halted at one or the other of the portals. As soon as this occurs, motor 131 operates to lower or open the portal door, and in so doing, it rotates shaft 106 and thereby cam 107 in a clockwise direction until notch 154 is brought into engagement with cam follower 157 whereupon switch 160 is open to disengage the terminals 161 and 162 and thereby to stop the operation of motor 131. As soon as the notch 154 shall have moved sufficiently in a counter-clockwise direction to disengage the cam follower 155, the switch 103 associated therewith will have moved from the position indicated in Figure 14 into circuit closing position with respect to terminals 150 and 151, thereby permitting a coil to be energized to cause operation of a motor direction control switch 164 whereby the motor will operate in the reverse direction, namely to close the portal door as soon as the control circuit shall have been closed by manual setting of the switch 143. A coil 165 cooperates with a switch 166 and is energized through switch 160 to close the circuit in such a way that the motor operates to open the portal door as previously described. The switches 164 and 166 together with their respective controlling coils 163 and 165 of a well known reversing type are interposed in the motor power circuit in conventional manner shown diagrammatically in Figure 14 so that it is not deemed necessary to describe the details thereof at length.

The portal door or curtain 137 is caused to operate by the chain 136 through any suitable connecting means such as a transverse bar 167, the lower edge of said curtain preferably being weighted, as by a bar 168 of metal or other suitable material. As indicated more clearly in Figure 9, the edges of the curtain 137 are arranged in guide channels 169. The curtain or door 137 may be of any suitable type of material, preferably a flexible or articulated curtain of metal or other fireproof construction. The transverse bar 167 to which the curtain is attached, has its intermediate portion or that which extends across the portal opening, of sufficient width to substantially close the space between the portal floor and the floor of a carrier in position at the portal when the curtain is in its lowered position. A block or stop 170, Figure 10, positioned to engage and support the lower edge of the transverse bar 167 limits the extent of downward movement thereof. Channel sections 245 are also mounted on top of said bar 167 to form continuations of guide channels 199 hereinafter to be referred to.

In a preferred embodiment of my invention, each carrier is provided with a curtain or closure 171; and in the case where the carriers are mounted in a U-shaped or O-shaped shaft with portals on opposite sides thereof, such a curtain is provided at each end of the carrier. As previously suggested, one purpose thereof is to provide a closing device whereby, if a fire occurs within one of the carriers, the combustion arresting material, such as foamite or other suitable fluid, may be substantially and more effectively confined within the carrier in which the fire occurs. For example, where the combustion arresting fluid is contained in a tank, as 172, Figure 3, provided with any well known heat responsive valve operating or releasing means, the occurrence of the critical temperature within any given carrier will release the contents of said tank, which will be prevented by the curtains 171 from overflowing and running down into the shaftway, at least sufficiently to insure the presence in the carrier of a sufficient quantity of the combustion arresting fluid to perform its intended function.

The curtains 171 are preferably mounted to be raised and lowered automatically with the raising and lowering of the curtain or door 137 of the portal. For this purpose, the upper edge of the curtain 171 is secured to a transverse bar 173 provided with spaced slots 174, Figures 11 and 12. A bracket 175 provides a housing for a plunger 176, the forward end of which extends into slot 174 to retain curtain 171 in its raised or closed position, said plunger being normally urged forward by a spring 177. The transverse supporting bar 167 of portal curtain 137, Figures 11 and 13, is also provided with slots 178 each of which contains a slider 179, one end of which extends laterally beyond the transverse bar 167 and in position to be engaged by a fixed inclined surface 180. In Figure 11, the parts hereinabove referred to are shown in the relative positions which they occupy just prior to the closing of the stop circuit or just after the closing of switch 143 and after the portal 137 has been moved to closed position by motor 131. Assuming therefore that the necessary mechanisms have operated to effect the downward or opening movement of curtain 137, slider 179 is pushed toward the left when it engages the inclined surface 180. The slots 174 and 178 being aligned, slider 179 pushes the plunger 176 rearwardly until it disengages the slot 174 and slider 179 engages said slot. Downward movement of the transverse bar 167 carries the slider 179 and the transverse bar 173 to their lowermost position, thus opening the portal and also opening the carrier. In the reverse operation, the slider 179 carries the transverse bar 173 upwardly until the bar 173 reaches its uppermost position whereupon plunger 176 being forced forwardly by spring 177 and the forward lower corner of plunger 176 being beveled, the slider 179 rides forward into slot 174 to its original position thereby displacing slider 179. When the slider 179 is thus disengaged there is no longer any connection between the carrier door and the portal door so that the carrier is then free to be moved to any other position in the system.

For hand control of the curtain 171, means are provided for disengaging plunger 176 from slot 174 other than the means hereinabove described for automatic operation. For example, in Figure 3, a bell crank lever 181 is mounted at each end of a shaft 182 and has one end positioned to engage the plunger 176 at 183. The opposite end carries a rope or chain 184. When this chain is pulled downwardly, the bell crank lever operates to retract the plunger 176, thus releasing said plunger from engagement with the slot 174. Where the curtain is suitably counterweighted as by a weight 224, Figure 3, it can readily be moved up or down by hand. By releasing or permitting the chain or rope 184 to move upwardly, plunger 176 again assumes its normal position with respect to slot 174.

The up-and-down movement of portal door 137 is also utilized to position suitable guards or buffers arranged within each carrier as a safety device to prevent the accidental movement of a car toward or against the curtains 171. Such an arrangement is shown in Figures 3 and 4 wherein bumpers 185 are mounted on lever arms 186 pivoted at 187. A counterweight 188 is adjustably mounted at the end opposite bumper 185. Each lever arm 186 is provided with a forwardly extending projection 189 arranged in the path of a lug 190 secured to and movable with a portion of the curtain 171. In operation, when the curtain 171 is in closed position, the numbers 185 are supported in their uppermost or operative position, as indicated in Figure 3. When the curtain 171 is moved downwardly to open position, the bumper 185 is deflected downwardly and moves into a slot 191, the bottom of which is below the floor level of the carrier so that a car may easily ride over the slot or recess 191 and be in position with one of its wheels engaging a curved groove 192 which marks the normal parked position of the car. When the carrier opening is again closed as above described, the bumper 185 assumes its operative position, thus tending to retain the car in parking position within the carrier.

As indicated in Figures 9 and 10, my improved carrier system may conveniently be incorporated in a shaftway of which the walls 193 form part of a building such as an apartment house, hotel or the like. Access is had to the portals 194 and 195 of said system by means of a roadway 196 in which a turntable 197 is positioned between said portals. Guide channels 198 are provided to guide the car wheels into and upon similar guide channels 199 mounted on the turntable 197. Similar channels are provided at the thresholds of the portals and also in the carriers.

The turntable 197 has a depending annular flange 200 positioned to ride upon a plurality of rollers 201, each of which is journaled in a post 202. The lower edge of said flange is provided with notches 203, so placed that when the turntable reaches its desired position in relation to the portals or to the roadway 196, it will come to rest with said notches engaging the rollers 201. At other times, or during normal rotation, the uninterrupted lower portions of the edges of flange 200 engage and ride upon the peripheries of rollers 201.

For economy and convenience in operation, a preferred form of turntable includes actuating means driven by power supplied from the car as it stands on the turntable. This arrangement saves the cost of motors or other power apparatus and also permits the user or driver of a car to rotate the turntable to any desired position without dismounting. Accordingly, to operate the turntable illustrated in Figures 9 and 10, driving rollers 204 are mounted in the path of the guide channels 199 and with portions of their peripheral surfaces exposed between the flanges of said channels so that, when a car is in position on the turntable, as indicated in Figure 10, the rear wheels of the car will ride upon and between the rollers 204. Chains 205 connect said rollers with a sprocket or pulley 206 secured to a horizontal shaft 207. As shown more clearly in Figure 18, shaft 207 is provided with a worm 208 meshing with a worm gear 209 mounted loosely on a driven shaft 210 and secured to an inner portion 211 of a clutch having an outer portion 212 secured in driving relation to the shaft 210. A gear 213 is mounted on shaft 210 and meshes with the teeth of an annular ratchet 214 supported on posts 215, Figure 10. As indicated in Figure 17, the shaft 207 carries a ratchet 216 cooperating with a pawl 217 to insure movement of shaft 207 in one direction only. Likewise, the clutch having the inner member 211 and the outer member 212 is provided with a recess 218 in said outer member. A ball 219 is located in said recess and in engagement with the periphery of the inner member 211, being yieldingly retained in said position by means of a spring 220. Accordingly, when the gear 209 and the inner member 211 are rotated in a counter-clockwise direction as indicated by the arrows in Figure 18, the shaft 210 also rotates in a counter-clockwise direction. However, when gear 210 is rotated in the opposite or clockwise direction, the outer member 212 of the clutch is not rotated and therefore the shaft 210 does not rotate.

The turntable driving rollers hereinabove described are arranged on the turntable 197 in such a way that when the rear wheels of the actuating car are turned in one direction, the turntable 197 will rotate and, when the wheels are turned in the opposite direction the turntable 197 will remain in fixed position. In operation, a car moves into the position indicated in Figure 10. When the rear wheels of said car are driven in the direction of the arrow, that is to say in reverse direction, the turntable rotates as long as the power of the car engine is applied. Ordinarily, a car occupying the turntable by way of the roadway 196 will be turned so as to face the left hand portal. As soon as the portal door opens, the car is driven forward into position on the selected carrier. If, however, the selected carrier should arrive at the right hand portal the driver of the car would then continue the reverse operation of his motor thus turning the turntable an additional 180 degrees (180°) so that his car could move forward to enter the carrier at the right hand side. If a driver should prefer to back into a carrier, he may avoid the turntable rotating effect of the rollers 204 by driving forward to a position with his rear wheels out of engagement with said rollers and then reversing without permitting his rear wheels to stop on the rollers 204. In this way no effective turntable operating power is transmitted to the shaft 207.

Under some conditions it will be desirable to control the movement of the carriers manually rather than automatically through the lock switches hereinabove described. For example, where a service or car cleaning portion of the garage system is on floor 17, Figure 1, means are provided whereby the operative in charge may readily bring the carriers into effective car receiving and discharging position at will. This presupposes cutting out the lock control system, so that when the service station control is on, the system will be inoperative from the portal stations.

As shown in Figure 5, a two-way switch 226 is interposed in the circuit containing the start and stop control devices. When closed in the direction shown in Figure 5 the system is operative from the portal controls and a lighting circuit having a lamp 222 is energized to provide a signal preferably at the portals indicating that portal station control is in effect. When switch 226 is closed in the opposite direction the portal controls are disconnected and a circuit containing a lamp 223 is energized to provide a signal preferably at the portals indicating that the service station control is in effect. The extent and direction of movement of the carriers is now controlled by a manually operated switch 219 having terminals 220 and 221 respectively. When switch 219 is closed through terminal 220, the carriers move in one direction until the switch is again opened. When switch 219 is closed through terminal 221, the carriers move in the opposite direction. This control permits an operative in the service station to bring any carrier by the shortest route into position to discharge or receive a car, preferably with the ends of the carrier located above pits 225 adapted to receive depending portions of the carrier curtains 171 when the latter are in open position. When a carrier is in the position corresponding to that of the lowermost carrier 2, Figure 1, the automatic door or curtain actuating means is not effective as to such carrier. The curtain 171 at either end may, however, be readily released and lowered by hand, the release being effected by retracting plunger 176 by means of chain 184, Figure 3, and then manually pulling down curtain 171 to a position, as indicated in Figure 1. The curtain is closed by pushing the bar 173 back to its upper position, this operation being facilitated by provision of the counterweight 224, Figure 3.

Nothing hereinabove described or explained in detail is to be interpreted as limiting the scope of the invention to the particular apparatus or to the particular mode of operation or both selected for purposes of illustration and explanation. While the details of construction herein set forth are suited to one embodiment of the invention, it is not so limited, nor to the conjoint use of all its features. It is to be understood that the particular forms of the described details are not essential since they may be variously modified within the skill of the artisan without departing from the contemplated scope of the present invention, characterizing features of which are set forth in the following claims by the use of generic terms and expressions intended to be inclusive of various modifications.

I claim as my invention:

1. In a carrier system, the combination of a track, a plurality of carriers operatively engaging said track and having separate driving motors, means in stationary relation to the track for starting said motors to move the carriers as a group, and means mounted on each carrier and having continuous operative connection with the track for causing said motors to stop with any selected carrier in any one of a number of predetermined relative positions in respect to the track.

2. In a carrier system, the combination of a track, a plurality of carriers mounted thereon and each having a separate driving motor, means positioned in fixed relation to the track for starting said motors, means mounted on each carrier and having continuous operative connection with the track for stopping said motors, and means cooperating with said starting means for causing effective operation of the motor stopping means.

3. In a carrier system, the combination of a track, a plurality of carriers, driving means on each carrier cooperating with a portion of said track to move said carrier, means for actuating the driving means of all said carriers, and means mounted on each carrier and arranged in continuous operative engagement with the track for automatically arresting movement of said carriers to position any selected one thereof at a predetermined point in relation to the track.

4. In a carrier system, the combination of a track having a curved portion and a straight portion, a carrier mounted for relative movement with respect to said track, a driving motor for said carrier, and means for automatically varying the speed of said motor at predetermined positions of said carrier in relation to the track, including automatic control means mounted on the carrier and adapted to move continuously in relation thereto during movement of the carrier.

5. In a carrier system, the combination of a track having a curved portion and a straight portion, a carrier mounted for movement in relation to said track, a driving motor for said carrier, and means mounted on the carrier for automatically varying the speed of said motor at predetermined positions of the carrier in relation to said track including actuating instrumentalities operatively connected to a driven portion of the motor.

6. In a carrier system, the combination of a track consisting of a rack having a curved portion and a straight portion, a carrier mounted for movement in relation to said rack, a motor, a drive shaft operatively connected with said motor and with said rack, a cam shaft, connecting means between said drive shaft and said cam shaft to impart to said cam shaft a 360 degree rotation during each complete cycle or traverse of said carrier in one direction, and motor speed control means actuated by said cam at predetermined positions of said carrier in relation to said rack.

7. In a carrier system, the combination of a track, a plurality of carriers mounted for movement thereon a reversible driving motor on each carrier, means operatively related to each carrier for reversing the effective current simultaneously in all of said motors, and means mounted on and operable by each carrier for actuating said reversing means at predetermined positions of said carrier in relation to the track.

8. In a carrier system, the combination of a plurality of carriers, a motor mounted on each carrier, a power circuit including a reversing switch, a plurality of independently operated switch actuating members, a plurality of cams mounted on a common shaft with their corresponding cam surfaces in staggered angular relation and adapted to engage said switch actuating members, and means on said carriers for effecting rotation of said shaft.

9. In a carrier system, the combination of a track having a vertical portion, a horizontal portion and a portion connecting said vertical and horizontal portions, a plurality of carriers each having driving and supporting means in operative relation to said track, means for automatically and independently varying the effective speed of the driving means of each carrier as it passes a predetermined portion of said track, without varying the effective driving speed of the driving means of other carriers at other portions of said track, said speed varying means being mounted on each carrier and actuated by the driving means thereof.

10. In a carrier system, the combination of a track, a plurality of carriers operatively engaging said track and having separate driving motors, means in fixed relation to the track for starting said motors to move the carriers as a group, and means for stopping said carriers to halt a selected carrier at a predetermined position, including a stop circuit having a contact mounted on and movable with each carrier, a contact in the path of said movable contact and in fixed relation to said predetermined position, and means operative as to a selected carrier to effectively close the stop circuit through said movable contact and said fixed contact.

11. In a multiple carrier system, the combination of a track, a carrier arranged and adapted to travel along said track, a carrier driving motor on the carrier, and means for automatically varying the speed of said motor at predetermined positions of the carrier in relation to the track including a movable member mounted on the carrier and operatively connected to the motor to move continuously in relation to the carrier during travel thereof.

12. In a carrier system, the combination of a track, a carrier arranged and adapted to travel along said track, a carrier driving motor on the carrier, and means for automatically varying the speed of said motor at predetermined positions of the carrier in relation to the track including a movable member mounted on the carrier and operatively connected to the track for effective continuous movement during carrier travel along a path different from that of the carrier.

13. In a carrier system, the combination of a plurality of motor driven carriers, a power current conductor operatively related thereto, a reversing switch in controlling relation to said conductor, a movable reversing switch actuating device for each carrier, said devices being operatively interconnected, and means operatively related to each carrier and adapted to move all of said devices simultaneously.

14. In a carrier system, the combination of a plurality of motor driven carriers, a power current conductor operatively related thereto, a reversing switch in controlling relation to said conductor, a movable reversing switch actuating device for each carrier, said devices being operatively interconnected, and including a member arranged in the path of the carriers, and means operatively related to each carrier adapted to engage said member to move all of said switch actuating devices simultaneously.

15. In a carrier system, the combination of a carrier, a carrier driving motor mounted thereon, a power supply circuit for the motor including, a switch, means for moving said switch to circuit closing position, and means for moving said switch to circuit opening position including a control circuit having a switch mounted on the carrier and a movable controlled switch actuating member mounted on the carrier and adapted and arranged for effective continuous movement during carrier travel along a path different from that of the carrier and in operative relation to said control switch.

16. In a carrier system, the combination of a carrier, a carrier driving motor mounted thereon, a power supply conductor for the motor, motor control means operatively connected with said conductor and means for actuating said motor control means including a switch mounted on the carrier, a movable switch actuating cam adapted and arranged for effective movement relative to the carrier during travel thereof, and means operatively arranged between said cam and the carrier to automatically move the cam into and out of switch operating position.

17. In a carrier system, the combination of a carrier, a carrier driving motor mounted thereon, a power supply circuit for the motor including a switch remote from the carrier, and means for actuating said power circuit switch, including a control circuit having a switch mounted on the carrier, a movable cam mounted on the carrier and adapted and arranged for effective movement relative to the carrier during travel thereof to engage and disengage said control circuit switch.

18. In a multiple carrier system, the combination of a carrier, a carrier driving motor mounted thereon, a track arranged and adapted to define the path of travel of the carrier, and motor control means arranged for effective operation at a predetermined position of the carrier in relation to the track and including a cam mounted on the carrier and means for moving said cam differentially in relation to the path of travel of the carrier and in a cycle synchronized in relation to the cycle of travel of the carrier along said track.

19. In a carrier system, the combination of a carrier, a carrier driving motor, a track arranged and adapted to define the path of travel of the carrier, and motor control means arranged for effective operation at a predetermined position of the carrier in relation to the track and including a movable element mounted on the carrier and means operatively connected to the track for moving said element differentially in relation to the path of travel of the carrier and in a cycle synchronized in relation to the cycle of travel of the carrier along said track.

20. In a carrier system, the combination of a carrier, a carrier driving motor, a track arranged and adapted to define the path of travel of the carrier, and motor control means arranged for effective operation at a predetermined position of the carrier in relation to the track and including a movable element and means operatively connected to the track for moving said element differentially in relation to the path of travel of the carrier and in a cycle synchronized in relation to the cycle of travel of the carrier along said track.

21. In a carrier system, the combination of a carrier, a carrier driving motor, a track arranged and adapted to define the path of travel of the carrier, and motor control means arranged for effective operation at a predetermined position of the carrier in relation to the track and including a movable element and means operatively connected to the motor drive shaft and to the track for moving said element differentially in relation to the path of travel of the carrier and in a cycle synchronized in relation to the cycle of travel of the carrier along said track.

22. A multiple carrier system wherein each carrier has a driving motor mounted thereon and arranged to actuate carrier advancing means, traverses a track which defines the path of the carrier, and motor control devices arranged in operative relation to the motor circuit are operated by actuating means effective when the carrier occupies a predetermined position in relation to the track, characterized in that said actuating means include an element adapted and arranged to be moved simultaneously with movement of the carrier, along a path of travel the extent of which is an aliquot part of the extent of travel of the carrier, and a member arranged in position to be moved by said element to actuate a portion of said control devices.

23. Apparatus according to claim 22 and further characterized in that said element is mounted on the carrier.

24. Apparatus according to claim 22 and including means operatively connected with said track for effecting operative movement of said element along its path of travel.

25. Apparatus according to claim 22 and in which said element is mounted on the carrier and is operatively connected to said track.

26. Apparatus according to claim 22 and in which said element is a cam operatively connected to the track.

27. Apparatus according to claim 22 and in which said element is a cam operatively connected to the track and to the motor.

28. Apparatus according to claim 22 and further characterized in that a switch operatively arranged in relation to the motor control devices is positioned to be actuated by said element.

29. Apparatus according to claim 22 and further characterized in that a variable resistance operatively arranged in relation to the motor circuit is positioned to be effectively actuated by said element.

30. Apparatus according to claim 22 and further characterized in that a motor reversing switch is operatively arranged in the motor circuit and switch actuating devices are operatively interposed between said switch and said element.

31. Apparatus according to claim 22 and further characterized in that said motor control devices include a motor reversing switch operated by said actuating means, and said element is mounted apart from the carrier and in position to be moved by devices having portions arranged in the path of travel of the carrier.

JAMES M. BOYLE.